United States Patent [19]
Bolleter et al.

[11] 3,790,391
[45] Feb. 5, 1974

[54] APPARATUS FOR STEAM PRESSURE COOKING OF FOOD

[75] Inventors: Hans Ulrich Bolleter, Lucerne; Hansruedi Schulthess, Kriens, both of Switzerland

[73] Assignee: Salvis AG, Reussbuhl, Switzerland

[22] Filed: Feb. 13, 1973

[21] Appl. No.: 332,111

[30] Foreign Application Priority Data
Feb. 17, 1972  Switzerland.......................... 2311/72

[52] U.S. Cl..................... 99/330, 99/332, 99/337, 99/340, 99/343, 126/20
[51] Int. Cl.............................................. A47j 27/06
[58] Field of Search..... 219/401; 126/20, 20.1, 348, 126/369; 99/216, 483, 467, 468, 340, 343, 337, 330, 332, 410, 413, 415, 351

[56] References Cited
UNITED STATES PATENTS

| | | | |
|---|---|---|---|
| 1,371,520 | 3/1921 | Schafer | 126/369 |
| 1,709,481 | 4/1929 | Mullen | 99/330 |
| 2,034,473 | 3/1936 | Kitamura | 126/348 |
| 2,237,739 | 4/1941 | Jones | 99/216 |
| 2,718,842 | 9/1955 | Klemm | 99/351 |
| 2,885,294 | 5/1959 | Larson et al. | 99/216 |
| 3,071,063 | 1/1963 | Churley | 99/332 |
| 3,431,902 | 3/1969 | Vischer | 99/332 X |
| 3,604,895 | 9/1971 | MacKay | 219/401 |
| 3,639,725 | 2/1972 | Maniscalo | 219/401 |
| 3,604,334 | 9/1971 | Ballentine | 99/483 |

*Primary Examiner*—Billy J. Wilhite
*Attorney, Agent, or Firm*—W. G. Fasse; W. W. Roberts

[57] ABSTRACT

In a steam pressure cooker into which externally generated steam is introduced to build up a gauge pressure at which the cooking process is greatly accelerated. An open top container for the reception of the food to be cooked is insertable into the vessel. A perforated steam distributer is placed at the bottom of the container and coupled with the steam inlet pipe so that the steam is forced to pass through the food from the bottom upwards and thereby ensures uniform heating of the food throughout its depth in the container. Valves for admitting and exhausting steam are controlled by a timer.

9 Claims, 7 Drawing Figures

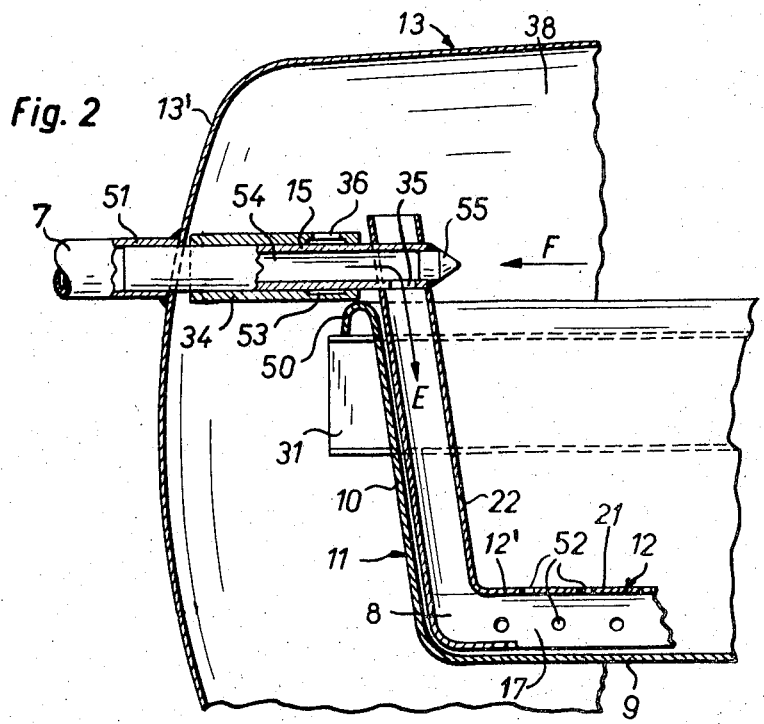
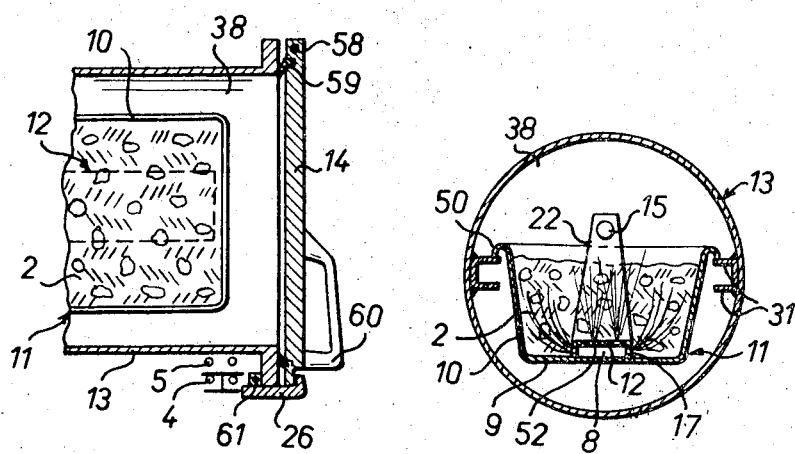
Fig. 2
Fig. 3
Fig. 4

APPARATUS FOR STEAM PRESSURE COOKING OF FOOD

BACKGROUND OF THE INVENTION

The invention generally relates to an apparatus for the high-speed pressure cooking of food by the introduction of steam into a pressure cooking vessel, whereby the steam as the source of heat is externally generated.

Steam pressure cookers are used in the catering trade for the high-speed cooking of food, also of frozen food. In a prior art construction of such a steam pressure cooker using externally generated steam the surface of the food is exposed to jets of steam from above. However, this results in a non-uniform distribution of heat in the food, the uppermost layers of food tending to be overcooked, whereas the bottom layers are insufficiently heated and remain undercooked. This is due partly to the jets of steam being condensed only in the uppermost layers and thus causing these layers to become particularly hot. Another factor is that the initially cold air in a pan containing the food to be cooked is beaten downwards by the jets of steam and blown in direction to the bottom of the pan where it forms cushions of trapped colder air which prevents the food from being evenly heated. This problem is particularly apparent with frozen vegetables.

Prior art devices do not include means enabling the steam to penetrate deeply and evenly into all layers of the food in a pan or other container.

SUMMARY OF THE INVENTION

The invention is directed to the provision of an apparatus for introducing steam into the food from the bottom of a pan or other container inserted in a pressure cooker and thereby forcing the steam to pass through the food from below upwards.

The apparatus according to the present invention comprises an open top container provided with a steam conduit which communicates with steam admission pipe means when the container is in its prescribed position inside the pressure vessel, said steam conduit being provided with steam outlet orifices in proximity with the bottom of the container for introducing steam into the food from below.

Such steam under pressure cooks the food evenly and quickly even if it is in a deep frozen state and had not before thawed out. As the food is cooked quickly and uniformly the time needed for the preparation of meals in restaurants or catering establishments can be substantially reduced. Furthermore - compared with conventional cookers in which steam jets are directed onto the food from above - deeper containers of pans of much larger capacity can be employed. It is also possible to heat liquids in containers of pans at a substantially higher rate than was possible in prior art processes in which heating is primarily by condensation of the steam at the surface of the liquid.

The invention will be better understood, and objects other than those set forth above, will become apparent, when consideration is given to the following detailed description thereof. Such description makes reference to the drawings, wherein:

FIG. 2 is a longitudinal vertical section of the rear portion of the steam pressure cooker with a food pan inserted;

FIG. 3 is a horizontal section of the steam pressure cooker taken along the line III—III in FIG. 1;

FIG. 4 is a cross section of the pressure cooker and of the food pan therein, taken along the line IV—IV in FIG. 1;

Figure 1:
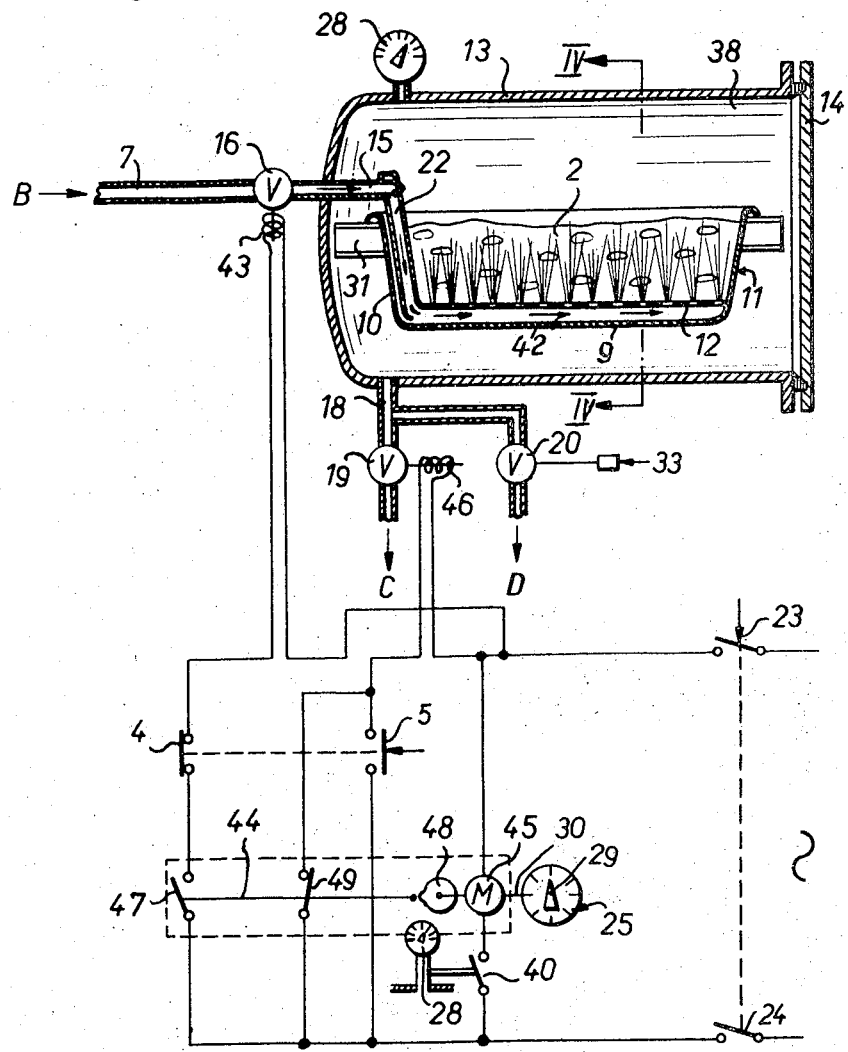
FIG. 1 is a longitudinal schematic section of a steam pressure cooker according to a preferred embodiment of the invention showing the general layout of the pipe means and electrical control circuits, the illustrated situation being that applying when the door of the pressure cooker is closed and the timer is still in zero position.

The food 2 that is to be cooked, such as meat, vegetables, rice or potatoes, is placed into an open-top tray-like container or pan 11 which has four sloping unperforated sides 10 and an unperforated horizontal bottom 9. This pan 11 is introduced into the interior of a pressure vessel 13 which substantially consists of a horizontal cylinder with one domed end 13'. The open front end of this pressure vessel 13 can be closed and sealed by a door 14 mounted on hinges 58, permitting the pressure inside the vessel 13 to be raised for cooking the food more quickly than would be possible in a pan 11 or another container which is open to the atmosphere. Horizontally attached to the insides of each of two facing sidewalls of the pressure vessel 13 is a rail 31 for supporting the bent over edge 50 of the pan 11. The door 14 cooperates with a latch 26 pivoting on a pin 61 which is parallel to the vertical hinge 58 of the door 14. Interposed between the door 14 and the edge of the open end face of the pressure vessel 13 is a sealing ring 59 of elastic material, such as rubber or the like. The door 14 can be opened and closed by means of a handle or grip 60.

The open top pan 11 contains steam conducting and distributing means 12 comprising a horizontal channel portion 21 extending directly above the bottom 9 of the pan 11 and an adjacent oblique channel portion 22 extending along the rear end wall 10 of the pan 11. The channel portion 21 extends generally over the entire length of the pan 11 and along its vertical midplane and is closed at the front end.

Both channel portions 21 and 22 are formed from sheet metal members and are limitting a conduit 8 for the steam. The two channel portions 21 and 22 are tightly connected together by weld seams and thus form a single knee-shaped part. Alternatively the two channel portions 21 and 22 may be designed to remain separate members that can be joined together for instance by fitting into one another.

The two side flanks 17 of the channel portion 21 rest loosely on the inside of the bottom 9 of the pan and the two side flankes 17 of the channel portion 22 bear against the inside of the rear wall 10 of the pan 11, forming thereby a rectangular section conduit 8 extending the full length of the pan 11 and occupying about 1/4 of the width of the pan bottom 9. Thus, the conduit 8 is limited by the U-shaped channel portion 21 together with the bottom 9 of the pan 11 and by the tube-like channel portion 22 bearing against the rear wall 10 of the pan 11. The cross section of the channel portion 22 decreases in the upward direction. The bottom as well as the two side flankes 17 of the channel portion 21 are provided with a plurality of small orifices 52 for distributing the steam over a large area. The channel portion 22 is not perforated. The integral of all open cross sections of the orifices 52 is more or less than the cross section of the channel portion 22, for instance only one-half to one-fourth thereof.

The substantially dry steam is generated in a steam generator (not shown) outside the pressure cooking vessel and flows under pressure through a steam pipe 7, as indicated by an arrow B (in FIG. 1). This steam pipe 7 is connected by a tightly sealing joint to a pipe connection 51 provided on the rear end wall 13'. Fitted into this pipe connection 51 is a short tube 15 having an internal bore 54. The inwardly projecting end of this tube 15 is plugged, but contains a downwardly directed hole 35 in its sidewall. The end of the tube 15 is coned and the cone 55 projects through a round opening in the channel portion 22 which has a corresponding diameter relative to the tube 15. Consequently steam can enter into the conduit 8 and flow then to the bottom part of the pan 11, as indicated by an arrow E in FIG. 2. The channel portion 22 rises above the upper edge of the pan 11 and the underside of the tube 15 lies near above the upper edge 50 of the pan 11.

The tube 15 is embraced by a movable sleeve 34 at the inside of the vessel 13 and has an internal circumferential groove 53 and an opening 36 at the top. If the food in the pan 11 is merely intended to be warmed up and not cooked, then a pan 11 lacking a steam distributor 12 can be used. For this purpose, by displacing the sleeve 34 in the direction contrary to that indicated by the arrow F until the groove registers with the opening 35 the steam will be deflected upwards to issue directly into the interior 38 of the pressure vessel.

By pushing a pan 11 provided with a steam distributor 12 along the rails 31 in the direction of arrow F into the vessel 13, communication will be established for the steam to enter the steam distributor 12 and to issue from the orifices 52 so that it will then pass in fine dispersion in upflow through the food 2 in the pan 11. The end of the tube 15 extending in the inside of the vessel 13 and the channel portion 22 which extends above the upper edge 50 of the pan and having an opening for receiving the tube 15 are forming a disengageable coupling.

If desired a conventional trap for condensed water may be incorporated in the steam pipe 7 before entering into the vessel 13 for the purpose of removing condensed water from the steam, which should be substantially dry.

Before entering the pressure vessel 13 the steam pipe 7 contains an electromagnetically operable steam admission valve 16 comprising a solenoid or an electromagnetic coil 43.

Fitted into the lowest point of the pressure vessel 13 drainage means are provided for the pressure vessel 11 consisting of an exhaust pipe 18 containing an exhaust valve 19 likewise operable by means of a solenoid or an electromagnetic coil 46. Through this pipe communicating with the interior of the pressure vessel 13, steam, air, gas and/or water can be exhausted, as indicated by an arrow C. A branch pipe by-passing the exhaust valve 19 in pipe 18 or communicating directly with the interior of the vessel contains a pressure limiting valve 20 which keeps the pressure inside the pressure vessel 13 within a prescribed maximum limit by automatically opening and allowing steam and liquid to blow off in the direction indicated by arrow D when this limit is exceeded. This valve 20 can also be opened manually by depressing a key 33, for instance in the event of nonoperation of the steam exhaust valve 19 due to a power failure. The pressure in the interior 38 of the pressure vessel 13 can be read on a dial gauge 28. his pressure gauge 28 communicating with the interior of the vessel has a pressure operated electrical switch 40 which it closes at a preset pressure as is well known in the art.

The electromagnetic valves 16 and 19 are normally closed and open when energized. They are connected in the circuit of a time switch or timer 25 of conventional construction.

For starting the pressure cooker a two-pole main switch comprising contacts 23 and 24 is closed, the exhaust valve 19 opens immediately — assuming the door 14 is open — whereas the steam valve 16 for the time being remains shut. This position results because the contacts 5 of a door-operated switch remain closed for as long as the door is open, whereas the second contact 4 remains open. The steam valve 16 cannot open until the door 14 has been closed, the contacts have changed over so that the contact 4 is now closed and the timer 25 has been set manually to the required cooking time.

When the door 14 is closed and secured by the latch 26, the steam pressure built up on the inside of the vessel keeps the latch 26 locked so that it can no longer be opened by hand. The contact 4 secures the correct closed position of the door 14 and of the latch 26. When the contact 4 remains open it breaks the circuit of the electromagnetic steam inlet valve 16 and causes this valve to remain shut.

The desired cooking time can be preselected by setting the timer 25 for any desired period of operation, this being done by turning a knob or pointer 29 on a shaft 30 carrying a disc-shaped cam 48 into a desired position on the timer dial. The positions of the open switches 47 and the closed switch 49 are thus reversed; 47 being thereafter closed and 49 opened. The steam valve 16 is opened by energization of its operating coil 43 and at the same time the steam exhaust valve 19 is closed by opening contact 49. The circuit for energizing the operating coil 43 of the valve 16 is established through the closed contacts 23 of the master switch, the coil 43 of the valve 16, the closed contacts at 4 and 47 and the contact 24 of the main switch. The electrical circuit of the exhaust valve 19 is interrupted because the contacts 5 and 49 are both open. The steam enters the steam distributor 12, flows along the bottom of the pan 11 and passes through the food 2 from below upwards, yielding its heat as it penetrates the food 2 in upflow and condenses. Since the steam passes through the contents of the pan 11 in the upward direction and issues at the top, the food is uniformly heated up very quickly.

As soon as the cooking food 2 has become hotter and the steam ceases to condense completely, pressure will build up in the interior 38 of the pressure vessel 13. It is to be noted that the size of the discharge pipe 18, the opening in the valve 19, or both, form an orifice having an area in relation to the rate of steam supply such that the pressure on the interior of the vessel will not appreciably increase until a rapid rate of steam no longer condensed in the food is flowing into the interior 38. The pressure then rises. When a predetermined gauge pressure has been reached in the interior 38 of the vessel 13, for example 2 to 6 lbs/sq. in. the timer 25 is automatically started, for example by expanding a bellows, a pressure-controlled switch 40 in the gauge 28 is closed so that a circuit for the motor 45 of the timer is closed and the motor 45 begins to rotate. For pressure cooking the gauge pressure is normally limited to about 14 lbs/sq. in.

The substantially dry steam which has passed through the food, and which leaves the top of the pan 11 also heats the food 2 from above and through the sides of the pan 11. This heating process can be further accelerated by continuing to admit, continuously or intermittently, a certain volume of steam into the steam distributor 12 after the required pressure for pressure cooking in the vessel 13 has already been reached or slightly before it is reached, i.e., at a given fractional pressure, and thereby continuing to heat the food by passing steam through its bulk. This is particularly useful for warming up large volumes of liquid. In such a case the exhaust valve 19 is briefly opened once or repeatedly by an appropriate electrical signal to the coil 46 or the valve 20 is opened once or several times by manual operation of key 21, permitting steam from the interior of the pressure vessel 13 to escape and a roughly like volume of fresh steam to be admitted into the interior of the pressure vessel 13 by the steam valve 16 so that the previously existing gauge pressure inside the pressure vessel 13 is approximately maintained. Controlling of the switch operation can easily be performed by an appropriate shape of the cam 48 driven by the timer or by one or two additional timer driven cams arranged on the same shaft 30. If the pressure in the steam pipe 7 is so controlled that it is roughly at the gauge pressure required for pressure cooking, then the steam valve 16 may remain open throughout the whole cooking process - including the periods of intermittently bleeding off steam over the exhaust valve 19.

In a modification of the described process the pressure limiting valve 20 may be so adjusted that it will open as soon as the pressure in the pressure vessel 13 has roughly reached the preselected level for pressure cooking and allow a limited volume of steam to blow off, fresh steam being continuously supplied through the permanently open steam valve 16 from the steam pipe 7 into the steam distributor 12 so that the preselected cooking pressure will approximately be maintained.

At the end of the cooking time to which the timer 25 has been set the cam 48 displaces the push rod 44, this opens the contact 47 and causes thereby the steam valve 16 to close and the steam exhaust valve 19 to open by virtue of the simultaneous opening of contact 49. The pressure inside the pressure vessel 13 will therefore fall to ambient pressure and the door 14 can thereafter be opened by hand for the removal of the pan 11 from the cooker.

Figure 5:
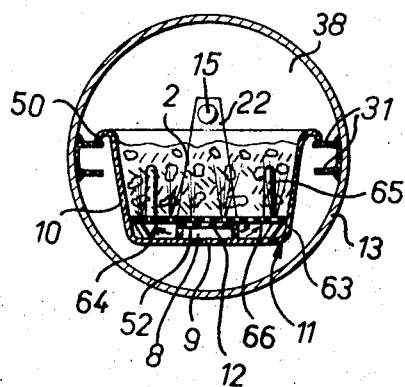
FIG. 5 is a cross section analogous to that of FIG. 4, showing an additionally inserted perforated horizontal false bottom.
Figure 6:
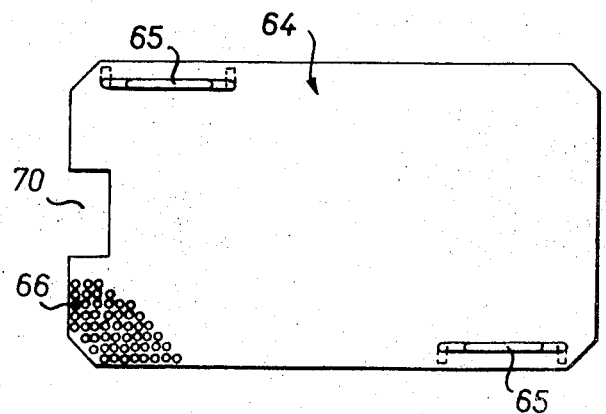
FIG. 6 is a plan view of the perforated false bottom.

For cooking some foods, such as fish, it may be desirable to insert a perforated plate of false bottom 64 into the pan 11, as shown in FIGS. 5 and 6. This perforated false bottom 64 contains a plurality of closely spaced small holes 66 over the full area. It has inclined downwardly directed legs 63 which rest loosely on the bottom 9 of the pan 11. A recess 70 is provided for the accommodation of the channel portion 22. In order to permit this false bottom 64 to be conveniently lifted out of the pan 11 it is fitted with two U-shaped handles 65 projecting in the upward direction.

Figure 7:
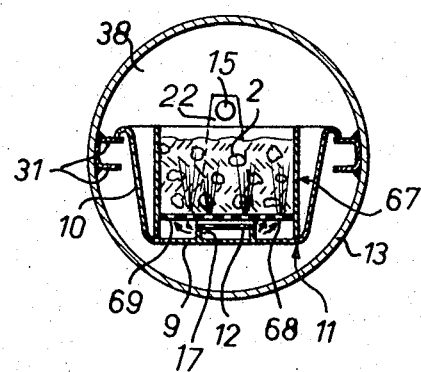
FIG. 7 is a cross section similar to that in FIG. 4, showing an additionally inserted basket for the food.

FIG. 7 illustrates an embodiment in which a basket 67 provided with openings or perforations 69 at the bottom 68 is inserted into the pan 11, for instance for the reception of foods from which moisture is intended to drip. The basket 67 is of a kind comprising four vertical sides 62 with or preferably without openings and extending downwards beyond the perforated bottom 68 to stand on the bottom 9 of the pan 11. This gives rise to the formation on each side of the steam distributing channel 21 of a cavity which fills with steam, and which likewise is under the openings of the perforated bottom 68, so that steam can rise through the entire area of the perforated bottom into and through the food.

Instead of only one pan 11 being provided the pressure cooker may contain in its interior 38 a plurality of pans stacked in tiers and each provided with separate supply means of fresh steam.

Various changes and modifications may be made within the inventive concept.

We claim:

1. A pressure cooking apparatus for food, comprising a pressure vessel (13) having a pressure sealing door (14), a tray-like container (11) for supporting the food (2) to be cooked or heated, exhaust line means (18) communicating with said vessel (13), a steam supply pipe (7) communicating with said vessel for introducing externally generated steam into said vessel (13), steam distributing means (12, 21, 22) in said container (11) having a perforated portion (17, 21) at least in the area near the bottom (9) of said container (11), coupling means (15) for coupling said steam distributing means (12) to said steam supply means (7) by inserting said container (11) into said vessel, steam inlet valve means (16) for controlling a flow of steam under pressure into said vessel (13) and valve means (19, 20) for controlling the exhaust of said steam from said vessel (13).

2. Apparatus as defined in claim 1, wherein said steam distributing means form a hollow channel (8) extending along one side wall (10) and along the bottom (9) of said container (11).

3. Apparatus as defined in claim 1, wherein said coupling means comprises a nozzle (15) fixed to the rear wall (13') of said vessel (13) and projecting into the interior (38) of said vessel (13) said nozzle having a downwardly directed opening, said steam distributing means having an upper part projecting over the rim (50) of the container, said nozzle (15) extending into said upper part (22) of said steam distributing means when the container (11) has been inserted into said vessel (13).

4. Apparatus as defined in claim 1, wherein only the portions (21) of the steam distributing means (12) extending parallel to the bottom (9) of the container (11) are perforated.

5. Apparatus as defined in claim 1, wherein a perforated false bottom (64) is inserted into the container (11) above the portions (21) of said steam distributing means (12) extending parallel and substantially over the whole of the bottom (9) of said container (11).

6. Apparatus as defined in claim 1, wherein a basket (67) with a perforated bottom (68) for the reception therein of the food (2) to be cooked is arranged above the portion of the steam distributing means (12) which is parallel to the bottom (9) of the container.

7. Apparatus as defined in claim 1, wherein the steam distributing means comprise a one-part knee-shaped piece (21,22) which is loosely placed into said container (11).

8. Apparatus as defined in claim 1, comprising first electrical switch means (49) for opening the steam exhaust valve (19) once or repeatedly during a short time after the pressure in said vessel (13) has reached a predetermined cooking level, second switch means (47) for opening said steam inlet valve means (16) to keep the pressure in said vessel (13) approximately constant at the predetermined cooking level.

9. Apparatus as defined in claim 1, comprising a pressure sensitive valve (20) which opens and permits steam to be exhausted when the pressure inside the vessel (13) has built up to the predetermined level, switch means (47) cooperating with said steam inlet valve (16) to hold said valve simultaneously open, the pressure of the steam admitted through said steam pipe (7) corresponding mainly to the cooking pressure and is slightly above the pressure at which said pressure sensitive valve (20) responds.

* * * * *